United States Patent Office 2,904,481
Patented Sept. 15, 1959

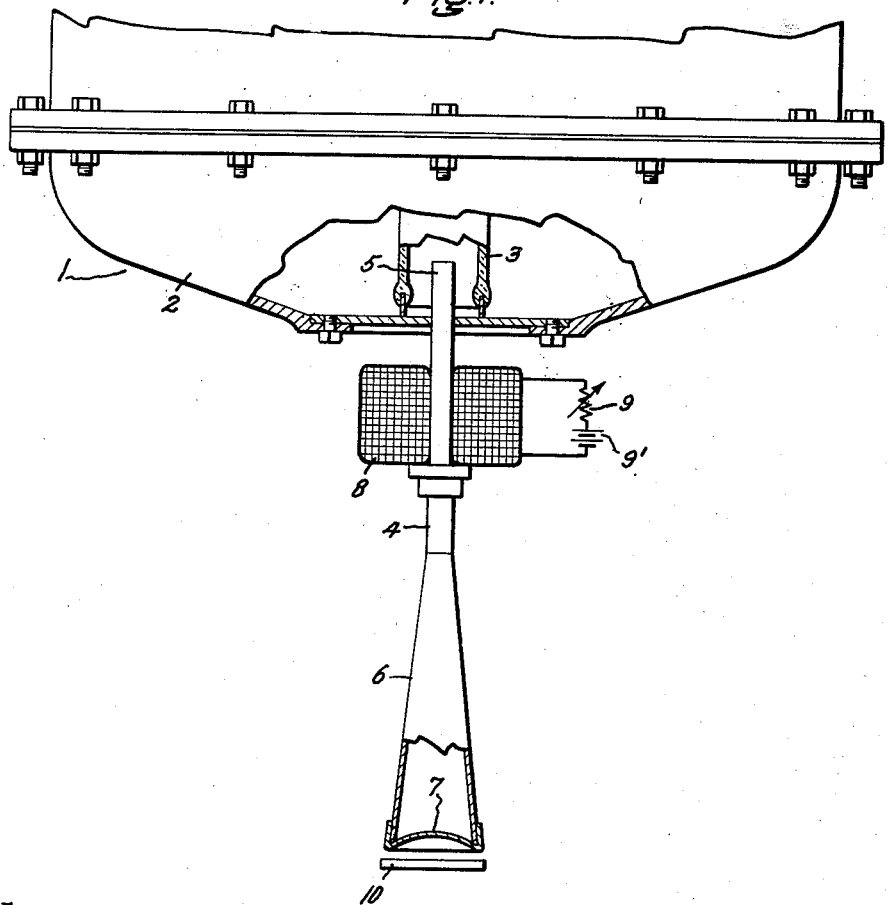
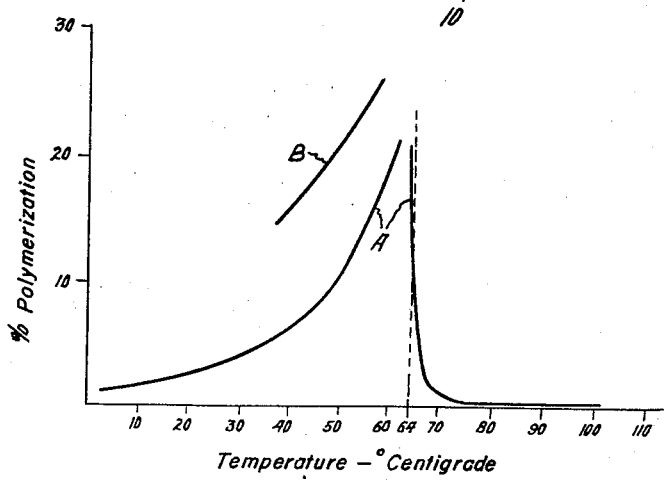
Fig. 2.
Inventors:
Elliott J. Lawton;
Willard T. Grubb, Jr.,
by Paul A. Frank
Their Attorney.

2,904,481

SOLID STATE POLYMERIZATION

Elliott J. Lawton and Willard T. Grubb, Jr., Schenectady, N.Y., assignors to General Electric Company, a corporation of New York Application June 29, 1955, Serial No. 518,814

9 Claims. (Cl. 204—154)

This invention relates to the irradiation of hexamethylcyclotrisiloxane (hereafter called "trimer"). More particularly, this invention relates to the irradiation of solid trimer with high energy, ionizing radiation.

Heretofore, cross-linked long chained organopolysiloxanes have been prepared from cyclic organopolysiloxanes by a two step process. In general, the siloxane structure is first rearranged in the presence of catalysts as acid and bases, for example, ferric chloride, sulfuric acid, cesium hydroxide, rubidium hydroxide, sodium hydroxide, potassium hydroxide, etc. so as to form linear oils or gums which are subsequently cross-linked by free-radical agents such as peroxides, peracids, N-chloroamines and amides, amine oxides, hydrazine salts, etc., or by high energy irradiation.

As disclosed in application Serial No. 429,137, Kantor, filed May 11, 1954, now U.S. Patent 2,766,220, and assigned to the same assignee as the instant application, when compounds such as octamethylcyclotetrasiloxane (hereafter called "tetramer") are irradiated, the following reaction takes place:

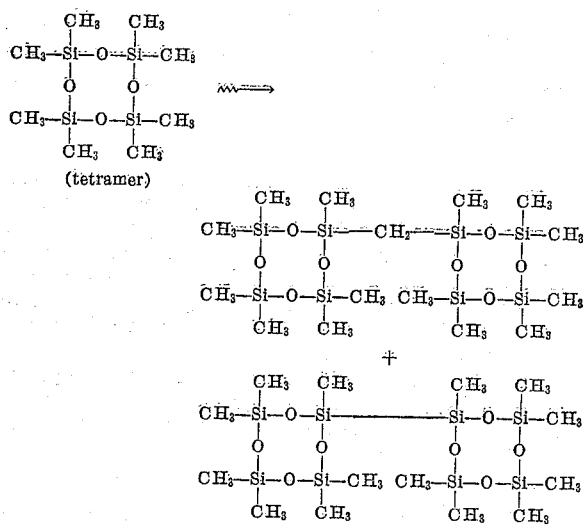

(tetramer)

In order to form linear cross-linked materials of these products produced by the irradiation of octamethylcyclotetrasiloxane, it is necessary to contact them with the standard rearrangement catalysts such as acids and bases. Thus, the formation of cross-linked organosiloxane polymers wherein the tetramer is first exposed to irradiation is also a two step process.

Unexpectedly, we have discovered that in contrast to the above results, the cyclic siloxane trimer of the following structure:

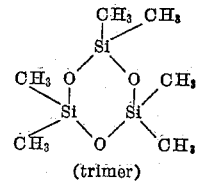

(trimer)

is both rearranged and cross-linked by irradiation alone in a one step process without the use of rearrangement catalysts. We have also discovered that this phenomenon takes place only when the trimer is in the solid state. The rate of polymerization as a function of temperature is unusual in that the rate increases with increasing temperature until the melting point of the trimer (about 64° C.) is reached above which temperature the rate decreases to almost zero. Furthermore, using the same total dose, the yield of polymer is greater at a slower dose rate.

Our invention may best be understood by reference to the following description taken in connection with the drawings. Fig. 1 is a simplified view of an electron accelerator apparatus useful in practicing this invention and Fig. 2 is a graph wherein the percent of cross-linked polymerized trimer (on the ordinate) is plotted against the temperature (° C.) (on the abscissa) at which the trimer is irradiated to a total dose of $2.3 \times 10^6$ R at the rate of 0.0192 R/sec. (curve B) and 0.192 R/sec. (curve A). The dotted line in Fig. 2 indicates the melting point of the trimer.

The trimer is ordinarily prepared from the hydrolysis of dimethyldichlorosilane or dimethyldiethoxysilane. When dimethyldichlorosilane is hydrolyzed with large excesses of water, a colorless oil is obtained. About one half of the oil comprises cyclic polymers of the type $[(CH_3)_2 SiO]_x$ where $x$ is an integer greater than 2 which compounds can be distilled from the oily reaction product at temperature of up to 200° C. under pressures as low as 1 mm. The proportions of the products are approximately 0.5% trimer, 42% tetramer, 7% decamethylpentasiloxane, 1.6% dodecamethylcyclohexasiloxane, about 1% of higher cyclic polymers, and 48% of a non-volatile oil.

This non-volatile oil comprises compounds of the type $HO[Si(CH_3)_2O]_x Si(CH_3)_2OH$ wherein $x$ is a large integer. This residual oil can be converted to volatile cyclic dimethylsiloxanes by pyrolytic rearrangement at 400–600° C. in the absence of oxygen. At 400° C. in a current of an inert gas such as nitrogen, a distillate is obtained containing about ½ by volume of trimer, about ¼ of tetramer, and the remainder higher cyclic polymers. Thus, the trimer constitutes a large part of the overall product. A detailed discussion of the preparation of cyclic organopolysiloxanes is found in Patnode et al., J. Am. Chem. Soc., 68, 360 (1946), and Hunter et al., J. Am. Chem. Soc., 68, 667 (1946).

In Fig. 1 there is shown high voltage accelerating apparatus 1 capable of producing a beam of high energy electrons for irradiating polymeric materials in accordance with the invention. High voltage accelerating apparatus 1 may be of the type disclosed in Patent 2,144,518, Westendorp, assigned to the same assignee as the present application. In general, this apparatus comprises a resonant system having an open magnetic circuit inductance coil (not shown) which is positioned within a tank 2 and energized by a source of alternating voltage to generate a high voltage across its extremities. At the upper end (not shown) of a sealed-off, evacuated, tubular envelope 3 is located a source of electrons which is maintained at the potential of the upper extremity of the inductance coil, whereby a pulse of electrons is accelerated down envelope 3 once during each cycle of the energizing voltage when the upper extremity of the inductance coil is at a negative potential with respect to the lower end. Further details of the construction and operation of high voltage accelerating apparatus 1 may be found in the aforementioned, Westendorp patent and in "Electronics," vol. 17, pages 128–133 (December 1944).

To permit utilization of the high energy electrons accelerated down envelope 3, there is provided an elongated metal tube 4, the upper portion 5 of which is hermetically sealed to tank 2, as illustrated, by any convenient means, such as silver solder. The lower portion 6 of tube 4 is conical in cross section to allow an increased angular spread of the electron beam. The emergence of high energy electrons from tube 4 is facilitated by an end-window 7 which may be hermetically sealed to tube 4 by means of silver solder. End-window 7 should be thin enough to permit electrons of desired energy to pass therethrough but thick enough to withstand the force of atmospheric pressure. Stainless steel of about 0.002 inch thickness has been found satisfactory for use with electron energies above 230,000 electron volts or greater. Beryllium and other materials of low stopping power may also be employed effectively. By forming end-window 7 in arcuate shape as shown, greater strength for resisting the force of atmospheric pressure may be obtained for a given window thickness. Desired focussing of the accelerated electrons may be secured by a magnetic-field generating winding 8 energized by a source of direct current 9' through a variable resistor 9.

In producing cross-linked polymer according to the invention, a layer 10 of solid trimer can be supported in the path of the electrons emerging from end-window 7 as illustrated. The high energy electrons penetrate the polymeric material to a depth dependent upon their energy and effect the above modifications in the properties of the material. Of course, layer 10 can be placed on a belt which is passed continuously under end-window 7 at a velocity selected to give the desired irradiation dosage. Other expedients for obtaining the irradiation of the trimer in various shapes (e.g., bottles, cups, tubing, filaments, pipes, etc.) can be effected by first shaping molten trimer and then allowing it to solidify prior to irradiation. Uniform treatment of the trimer having appreciable thickness can be assured by irradiating it first from one side and then the other or in some cases from both sides simultaneously. In certain instances, it may be desirable to irradiate the trimer in a vacuum or in an atmosphere of nitrogen, argon, helium, krypton or xenon, etc., to prevent the damaging effect of any ozone which may be present.

The measure of the amount of radiation is a Roentgen unit (R) which, as usually defined, is the amount of radiation that produces one electrostatic unit of charge per milliliter of dry air under standard conditions and, as employed herein, refers to the amount of electron radiation measured with an air equivalent ionization chamber at the position of the upper surfaces of the polymeric materials.

Irradiation can be advantageously carried out below room, at room, or at elevated temperatures. Since maximum polymerization occurs just below the melting point, the temperature range of 50–64° C. is preferred.

It will be readily realized that other forms of electron accelerating apparatus may be employed instead of high voltage apparatus 1, for example, linear accelerators of the type described by J. C. Slater in the "Reviews of Modern Physics," vol. 20, No. 3, pages 473–518 (July 1948), may be utilized. To decrease wasteful energy absorption between the point of exit of electrons from the accelerating apparatus and the trimer, a vacuum chamber having thin entrance and exit windows may be inserted in the space.

In general, high energy ionizing radiation employed in the practice of the invention may preferably range from about 50,000 electron volts to 20 million electron volts or higher, depending upon the depth to which it is desired to affect the trimer. Although the electron radiation sources described above are preferred because they afford an easily controlled means of obtaining high doses within a short period of time, many other sources of high energy ionizing radiation can also be used in our invention. Examples of such radiation sources are gamma rays, such as can be obtained from $Co^{60}$, "burnt" uranium slugs, fission by-products, such as waste solutions, separated isotopes, such as $Cs^{137}$, gaseous fission products liberated from atomic reactions, etc.; other electron sources, such as the betatron, etc.; fast or slow neutrons or the mixed neutron and gamma radiation, such as is present in certain atomic reactors; X-rays; and other miscellaneous sources, such as protons, deuterons, α-particles, fission fragments, such as are available from modern cyclotrons, etc.

In order that those skilled in the art may better understand how the present invention may be practiced, the following examples are given by way of illustration and not by way of limitation. All parts and percentages are by weight.

*Example 1*

Pure crystalline trimer (M.P. 64° C.) was irradiated with high energy electrons derived from a 800 kilovolt peak (kvp.) resonance transformer to a total dose of $2.3 \times 10^6$ R at the rate of 0.192 R/sec. The irradiation was carried out over the temperature range shown in curve A of Fig. 2. After irradiation, the product was evacuated to constant weight. Since the monomer is quite volatile (about 4 mm. vapor pressure at room temperature) a final weighing established the amount of polymer produced. The percent of polymer produced under these conditions is shown in curve A of Fig. 2. The polymer obtained was insoluble in benzene (evidence of cross-linking) and had all the characteristics of cross-linked high molecular weight polydimethylsiloxane, thus indicating that siloxane rearrangement and cross-linking took place simultaneously.

*Example 2*

A similar polymerization was carried out in the same manner as in Example 1 over the temperature range shown in curve B of Fig. 2 except that a slower irradiation rate was used i.e., 0.0192 R/sec. although the total dose was the same. As shown in curve B, the yield of polymer at a given temperature was greater at this lower dose rate. The product exhibited characteristics similar to those of Example 1.

In order to find out if this simultaneous rearrangement cross-linking phenomenon would take place with chemical free radical initiators, the following examples were run:

*Example 3*

Trimer was intimately mixed with Porophor-N, α,α'-azodi-(isobutyronitrile), at a concentration of 0.5%, based on the weight of trimer, and the mixture was kept at 60° C. (monomer solid) for 24 hours. No polymer was formed within this period.

*Example 4*

Trimer was intimately mixed with benzoyl peroxide at a concentration of 0.5%, based on the weight of trimer, and the mixture was kept at 80° C. (monomer liquid) for 24 hours. No polymer was formed within this period.

Since no polymer resulted when trimer was treated with chemical free radical agents, it is unexpected that irradiation would effect the rearrangement-cross-linking phenomenon.

The polymerization can also be carried out in the presence of fillers such as silicas, silica aerogels, silica aerosils, hydrophobic silicas such as surface esterified silicas described in U.S. Patent 2,657,149, Iler, and silicas treated with various chlorosilanes in the manner of Patents 2,510,661 and 2,563,555, both granted to Safford and assigned to the same assignee as the present invention, and 2,584,085, Stross, etc. Other fillers that may be used are metal silicates such as calcium silicate, alpha and gamma aluminas, carbon blacks, clays, calcium carbonate, magnesium carbonate, titanium dioxide, etc. the finely divided fillers being preferred. In addition various other fillers, stabilizers, modifying agents, dyes, etc. may be used.

A convenient method of incorporating the fillers into the timer is to add the filler, preferably finely divided, to the molten timer, stirring this mixture until a homogeneous mixture is obtained. The product is allowed to solidify and then irradiated.

Molten trimer can be shaped, solidified, and then irradiated. These products are useful in applications to which cross-linked organopolysiloxanes can be applied such as, for instance, tubing, electrical insulation (e.g., as conductor insulation) and the like. They are particularly useful as gaskets in applications involving high temperature conditions, especially in those places where they may be subjected to the effects of halogenated hydrocarbons as insulating media, namely, in the manufacture of capacitors. Because of their improved heat resistance, they are valuable as materials for use in applications where natural or other synthetic rubbers may fail owing to the deleterious effect of heat. Elastomers produced by the practice of our invention have the additional property of retaining their flexibility at low temperatures, for example, at temperatures as low as at least minus 60° C.

Water repellant films of cross-linked organopolydimethylsiloxanes can be prepared by dissolving the trimer in a suitable solvent, for example, a hydrocarbon solvent e.g. benzene, toluene, petroleum ether, or a halogenated solvent e.g. carbon tetrachloride, etc. applying this solution to a surface, evaporating the solvent therefrom, and irradiating while in a solid state. Leather, textiles, paper, and the like can be rendered water repellant in this manner.

Useful coating materials can be prepared by irradiating the trimer mechanically or colloidally suspended in a non solvent such as water, etc. This product can be applied to various surfaces and the liquid removed therefrom forming a solid layer.

What we claim as new and desire to secure by Letters Patent of the United States is:

1. A process of preparing cross-linked polydimethylsiloxanes which comprises irradiating solid hexamethylcyclotrisiloxane with ionizing radiation having energy equivalent to at least $5 \times 10^4$ electron volts.

2. A process of preparing cross-linked polydimethylsiloxanes which comprises irradiating hexamethylcyclotrisiloxane at 50–64° C. with ionizing radiation having energy equivalent to at least $5 \times 10^4$ electron volts.

3. A process of imparting water repellancy to an article of manufacture which comprises applying hexamethylcyclotrisiloxane thereto and irradiating said article at a temperature not exceeding 64° C. with ionizing radiation having energy equivalent to at least $5 \times 10^4$ electron volts.

4. The process as in claim 1 wherein electrons are the source of ionizing radiation.

5. The process as in claim 4 wherein the electrons have energy in the range of $5 \times 10^4$ to $2 \times 10^7$ electron volts.

6. The process as in claim 2 wherein electrons are the source of ionizing radiation.

7. The process as in claim 6 wherein the electrons have energy in the range of $5 \times 10^4$ to $2 \times 10^7$ electron volts.

8. The process as in claim 3 wherein electrons are the source of ionizing radiation.

9. The process as in claim 8 wherein the electrons have energy in the range of $5 \times 10^4$ to $2 \times 10^7$ electron volts.

References Cited in the file of this patent

UNITED STATES PATENTS 2,766,220   Kantor _____ Oct. 9, 1956

OTHER REFERENCES

Lawton et al.: "Nature," July 11, 1953, vol. 172, pages 76, 77.

Charlesby: "Nature," Apr. 10, 1954, vol. 173, pages 679, 680.